(12) United States Patent
Huang et al.

(10) Patent No.: US 8,185,223 B2
(45) Date of Patent: May 22, 2012

(54) MULTIMEDIA PLAYING METHOD AND APPARATUS USING THE SAME

(75) Inventors: Jen-I Huang, Taichung County (TW); Chyou-Hsiung Hwang, Hsinchu (TW)

(73) Assignee: ITE Tech. Inc., Hsinchu (TW)

( * ) Notice: Subject to any disclaimer, the term of this patent is extended or adjusted under 35 U.S.C. 154(b) by 614 days.

(21) Appl. No.: 12/400,808

(22) Filed: Mar. 10, 2009

(65) Prior Publication Data

US 2010/0138011 A1 Jun. 3, 2010

(30) Foreign Application Priority Data

Dec. 2, 2008 (TW) .............................. 97146770 A (51) Int. Cl.
*G06F 17/00* (2006.01)
(52) U.S. Cl. ...................................................... 700/94
(58) Field of Classification Search .................. 700/94; 704/500–504; 369/30.23, 47.33
See application file for complete search history.

(56) References Cited

U.S. PATENT DOCUMENTS

| | | | |
|---|---|---|---|
| 6,502,194 B1 * | 12/2002 | Berman et al. ................... 726/28 |
| 6,847,593 B2 * | 1/2005 | Millikan et al. ........... 369/30.23 |
| 6,934,812 B1 | 8/2005 | Robbin et al. |
| 7,042,813 B2 | 5/2006 | Millikan et al. |
| 7,231,340 B2 * | 6/2007 | Burchard et al. ............. 713/300 |
| 7,797,064 B2 * | 9/2010 | Loomis et al. ................... 700/94 |
| 7,830,754 B2 * | 11/2010 | Wang et al. ................. 369/30.23 |
| 2001/0030660 A1 * | 10/2001 | Zainoulline .................... 345/720 |
| 2003/0210617 A1 * | 11/2003 | Millikan et al. ........... 369/30.23 |
| 2007/0156962 A1 | 7/2007 | Hodge et al. |
| 2007/0195654 A1 * | 8/2007 | Chen .......................... 369/30.23 |

\* cited by examiner

*Primary Examiner* — Andrew C Flanders
(74) *Attorney, Agent, or Firm* — Jianq Chyun IP Office (57) ABSTRACT

A multimedia playing method is provided. First, N audio files selected by a user are received, wherein N>0. Then, the memory space required for playing each of the N audio files for a predetermined time is respectively detected. Next, whether total memory space required by the N audio files is not smaller than a predetermined value is determined. If the total memory space required by the N audio files is not smaller than the predetermined value, the predetermined time is reduced and the step of respectively detecting the memory space required for playing each of the N audio files for the predetermined time is executed again. If the total memory space required by the N audio files is smaller than the predetermined value, an initial part of each of the N audio files to be played for the predetermined time is stored into the memory.

14 Claims, 4 Drawing Sheets

MULTIMEDIA PLAYING METHOD AND APPARATUS USING THE SAME

CROSS-REFERENCE TO RELATED APPLICATION

This application claims the priority benefit of Taiwan application serial no. 97146770, filed Dec. 2, 2008. The entirety of the above-mentioned patent application is hereby incorporated by reference herein and made a part of specification.

BACKGROUND OF THE INVENTION

1. Field of the Invention

The present invention generally relates to a multimedia playing method and apparatus, and more particularly, to a multimedia playing method and apparatus which can shorten the playing delay and optimize the planning of a buffer memory and the shock protection time.

2. Description of Related Art

A walkman compact disc (CD) player or a car CD player is distinct from a general CD player in that the walkman or the car CD player usually operates in a vibratile environment. An optical pickup head of the CD player may not be able to read data correctly in a vibratile environment and accordingly the playing becomes discontinuous. Typically, there are two kinds of solutions which may be adopted to prevent the playing discontinuity. One is to enhance the shock endurance mechanism of the CD player. The other is to introduce a buffer memory in which the CD player stores a part of a soundtrack to be played (determined by the size of the buffer memory, for example, 40 seconds of the soundtrack) into the buffer memory. In operation, the CD player directly reads and plays the soundtrack from the buffer memory. When the optical pickup head of the CD player cannot read data because of some shocks, the CD player can still play the soundtrack from the buffer memory. As a result, playing discontinuity is avoided.

Along with the development of CD players, a CD player nowadays is capable of playing compressed soundtracks, such as MP3 files, adaptive predictive encoding (APE) files, or free lossless audio codec (FLAC) files. Generally speaking, the mp3 files may have a compression rate of 1:10. Even though compression may result in loss of audio quality, the MP3 format is still popular for its "convenient size". The APE and FLAC files are compressed through lossless compression techniques, therefore, they also take an important part in the market. A compressed soundtrack has a smaller file size. Taking the MP3 format with a transmission rate of 128K bit/s and a sampling frequency of 44100 Hz as an example, the file size of a 5-minute soundtrack is only about 4 to 5 M bytes. Thereby, several MP3 files can be stored into a buffer memory and accordingly a shock protection effect sometimes may up to hundreds of seconds.

However, a CD player with a buffer memory may still produce some problems. For example, when a CD player is playing a first soundtrack on a CD (i.e., parts of the first soundtrack is stored in the buffer memory of the CD player) and if a user wants to play another soundtrack and presses the "next track" button, the CD player has to erase the buffer memory first and then start to store parts of the selected soundtrack into the buffer memory. Even though the capacity of the buffer memory is large enough for storing more than one soundtrack, e.g. storing the first, the second and the third soundtracks when playing the first soundtrack, if the user wants to play a fifth soundtrack, the CD player still needs to erase the buffer memory and then start to store the fifth, the sixth and the seventh soundtracks into the buffer memory. It results in playing delay during the erasing and storing operation. Similarly, a mini disc (MD) player has the problem as well.

Accordingly, a disc player having a disc and a cache memory is disclosed in U.S. Pat. No. 6,934,812. When a user selects a file, the file is divided into an initial part and a remaining part. At playing, the disc player reads the initial part of the file and directly plays it without storing it into the cache memory. As a result, the delayed time for playing the file is shortened. Moreover, while playing the initial part, the player retrieves the remaining part of the file to store into the cache memory, which means the remaining part has to go through the cache memory to be played.

A player is disclosed in U.S. Pat. No. 7,042,813, wherein when playing a soundtrack, the player retrieves the initial parts of a plurality of soundtracks and stores these initial parts into a buffer memory. However, the initial parts of the soundtracks stored in the buffer memory are deleted after they are played, and accordingly, the player has to constantly detect whether the part which is not yet played in the buffer memory is lower than a threshold.

A disc player is disclosed in U.S. patent No. US20070156962, wherein a user defines a playlist, and each file on the playlist is divided into an initial part and a remaining part. These initial parts (2% of the file size) are stored into a buffer memory to avoid the playing delay problem.

SUMMARY OF THE INVENTION

The present invention is directed to a multimedia playing method and a multimedia playing apparatus to effectively plan the shock protection time (buffer time) and shorten the playing delay.

The present invention provides a multimedia playing method suitable for a multimedia playing apparatus. The multimedia playing apparatus has a memory and K audio files, wherein K>0. The multimedia playing method includes following steps. First, N audio files selected by a user are received, wherein $0<N\leq K$. Then, memory space required for playing each of the N audio files for a predetermined time is respectively detected. Next, whether total memory space required by the N audio files is not smaller than a predetermined value is determined. If the total memory space required by the N audio files is not smaller than the predetermined value, the predetermined time is reduced, and the step of respectively detecting the memory space required for playing each of the N audio files for the predetermined time is executed again. If the total memory space required by the N audio files is smaller than the predetermined value, each initial part of the N audio files to be played for the predetermined time is stored into the memory.

According to an embodiment of the present invention, the multimedia playing method further includes following steps after the step of reducing the predetermined time. First, whether the predetermined time is smaller than a specific time is determined. If the predetermined time is not smaller than the specific time, the step of respectively detecting the memory space required for playing each of the N audio files for the predetermined time is executed again. If the predetermined time is smaller than the specific time, the predetermined value is increased.

According to an embodiment of the present invention, the multimedia playing method further includes detecting a format and encoding information of the audio files.

According to an embodiment of the present invention, the format of the audio files is a MP3 format, an APE format, a FLAC format or a WAV format.

According to an embodiment of the present invention, the predetermined value varies with the number of the N audio files.

According to an embodiment of the present invention, the portion of the memory for storing the initial parts of the N audio files to be played for the predetermined time is defined as a first section of the memory, and the other portion of the memory is defined as a second section of the memory.

According to an embodiment of the present invention, the multimedia playing method further includes following steps. First, the first section of the memory is read to play the initial part of one of the N audio files. Then, a subsequent part following the initial part of the currently played audio file is meanwhile stored into the second section of the memory. Next, the second section of the memory is read to play the subsequent part.

According to an embodiment of the present invention, the multimedia playing method further includes erasing the played portion of the subsequent part from the second section.

The present invention provides a multimedia playing method suitable for a multimedia playing apparatus. The multimedia playing apparatus has a memory and K audio files, wherein K>0. The multimedia playing method includes following steps. First, N audio files selected by a user are received, wherein 0<N≦K. Then, whether N is smaller than a predetermined number is determined. If N is smaller than the predetermined number, the multimedia playing apparatus retrieves each N audio file for a predetermined size, and plans a first section of the memory for storing the predetermined size of the N audio files. If N is not smaller than the predetermined number, the multimedia playing apparatus plans a first section of the memory to store each initial part of the N audio files according to N, wherein the first section of the memory is evenly distributed to each audio file.

According to an embodiment of the present invention, the portion of the memory for storing the initial parts of the N audio files is defined as the first section of the memory, and the other portion of the memory is defined as a second section of the memory.

According to an embodiment of the present invention, the multimedia playing method further includes following steps. First, the first section of the memory is read to play the initial part of one of the N audio files. Then, a subsequent part following the initial part of the currently played audio file is stored into the second section of the memory. Next, the second section of the memory is read to play the subsequent part.

According to an embodiment of the present invention, the multimedia playing method includes erasing the played portion of the subsequent part from the second section.

According to an embodiment of the present invention, the multimedia playing method further includes detecting a format and encoding information of the audio files.

According to an embodiment of the present invention, the format of the audio files is a WAV format, an APE format, a FLAC format or a MP3 format.

The present invention provides a multimedia playing apparatus including a storage unit, a multimedia input interface, a user interface, a memory, and a control unit. The storage unit provides K audio files, wherein K>0. The multimedia input interface is coupled to the storage unit for receiving the K audio files. The user interface receives N audio files selected by a user, wherein 0<N≦K. The memory is coupled to the multimedia input interface and has a first section and a second section, wherein the first section is used for storing initial parts of the N audio files, and the second section is used for storing subsequent parts of the N audio files other than the initial parts thereof. The control unit is coupled to the multimedia input interface, the memory, and the user interface for adjusting the capacities of the first section and the second section. To be specific, the control unit first detects a format and encoding information of the N audio files and determines whether total memory space required by the N audio files to be played for a predetermined time is smaller than a predetermined value and then adjusts the capacities of the first section and the second section accordingly.

According to an embodiment of the present invention, the memory is a volatile memory or a non-volatile memory.

According to an embodiment of the present invention, the storage unit is a compact disc (CD) or a mini disc (MD).

According to an embodiment of the present invention, the audio files may be in a WAV format, an APE format, a FLAC format or a MP3 format.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Figure 1:
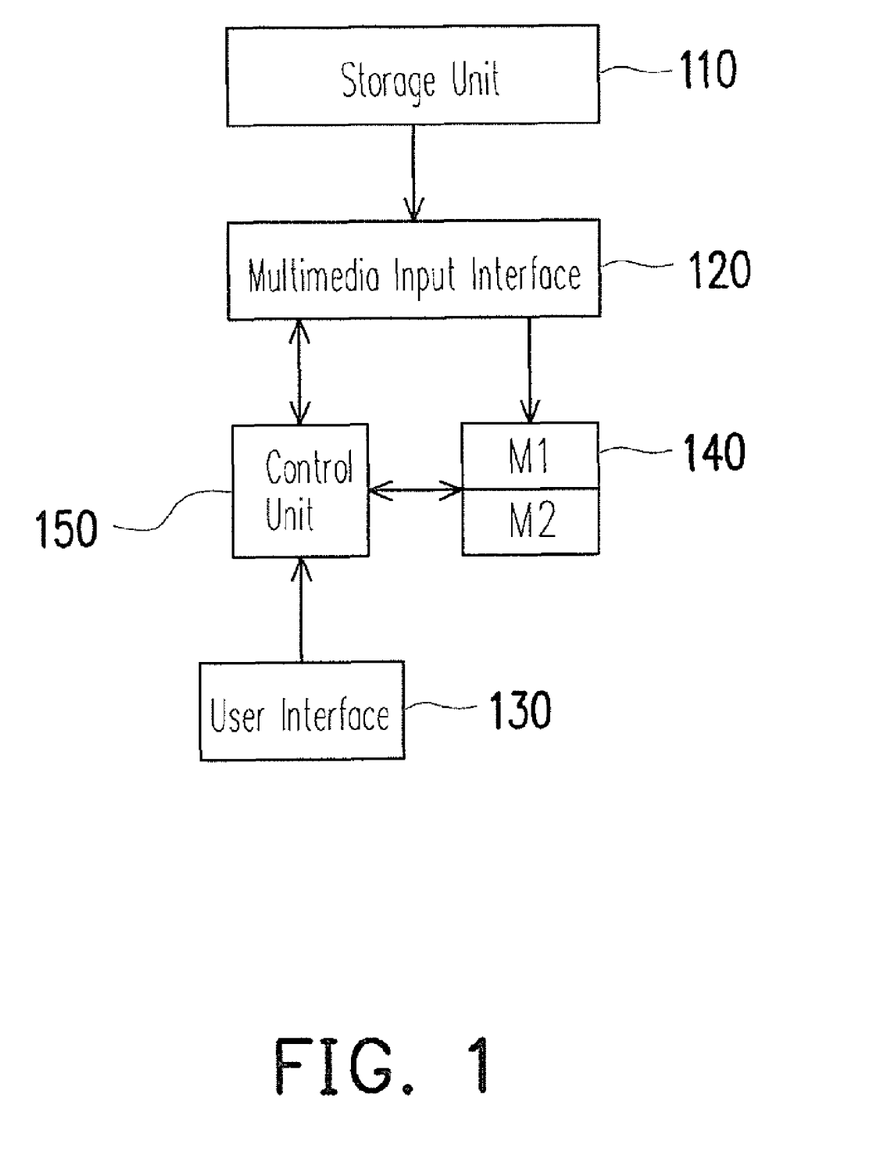
FIG. 1 is a block diagram of a multimedia playing apparatus according to an embodiment of the present invention.

FIG. 1 is a block diagram of a multimedia playing apparatus according to an embodiment of the present invention. Referring to FIG. 1, the multimedia playing apparatus 100 includes a storage unit 110, a multimedia input interface 120, a user interface 130, a memory 140, and a control unit 150. The storage unit 110 provides K audio files/tracks, wherein K>0. In the present embodiment, the storage unit 110 may be a compact disc (CD) or a mini disc (MD) which stores audio files in the WAV format or MP3 format.

The multimedia input interface 120 is coupled to the storage unit 110 for receiving the K audio files. The user interface 130 receives N audio files selected by a user, wherein 0<N≦K. To be specific, the user selects N audio files from the K audio files provided by the storage unit 110 through the user interface 130. For example, assuming K=10, which means the storage unit 110 provides 10 audio files TR1~TR10, the user can then select N audio files from the audio files TR1~TR10. If the user selects 2 audio files TR1 and TR2, then N=2, and if the user selects 4 audio files TR1, TR3, TR5, and TR8, then N=4, and so on. The user may select audio files in sequence or randomly.

The memory 140 is coupled to the multimedia input interface 120 and has a first section M1 and a second section M2. The first section M1 is used for storing initial parts of the N audio files, and the second section M2 is used for storing subsequent parts of the N audio files. For example, the first section M1 stores the first 30 seconds of each of the N audio files, and the second section stores the subsequent part of each of the N audio files following the first 30 seconds. In the present embodiment, the memory 140 is a volatile memory or a non-volatile memory.

The control unit 150 is coupled to the multimedia input interface 120, the user interface 130, and the memory 140 for adjusting the capacities of the first section M1 and the second section M2 in the memory 140 according to the N audio files. To be specific, the control unit 150 first detects a format (WAV format, MP3 format, APE format, or FLAC format) and encoding information of the N audio files and then adjusts the capacities of the first section M1 and the second section M2 in the memory 140. For example, when the control unit 150 detects there is a MP3 file, it detects or retrieves the encoding information of the MP3 file, such as sampling frequency, bitrate, mono or stereo, and so forth. Similarly, when the control unit 150 detects there is a FLAC file, it detects or retrieves the encoding information of the FLAC file. After detecting each format of the N files, the control unit 150 determines whether total memory space required by the N audio files to be played for a predetermined time is smaller than a predetermined value or not. The determination is later used to trigger the adjustment of the capacities of the first section M1 and the second section M2 (details see below).

Figure 2:
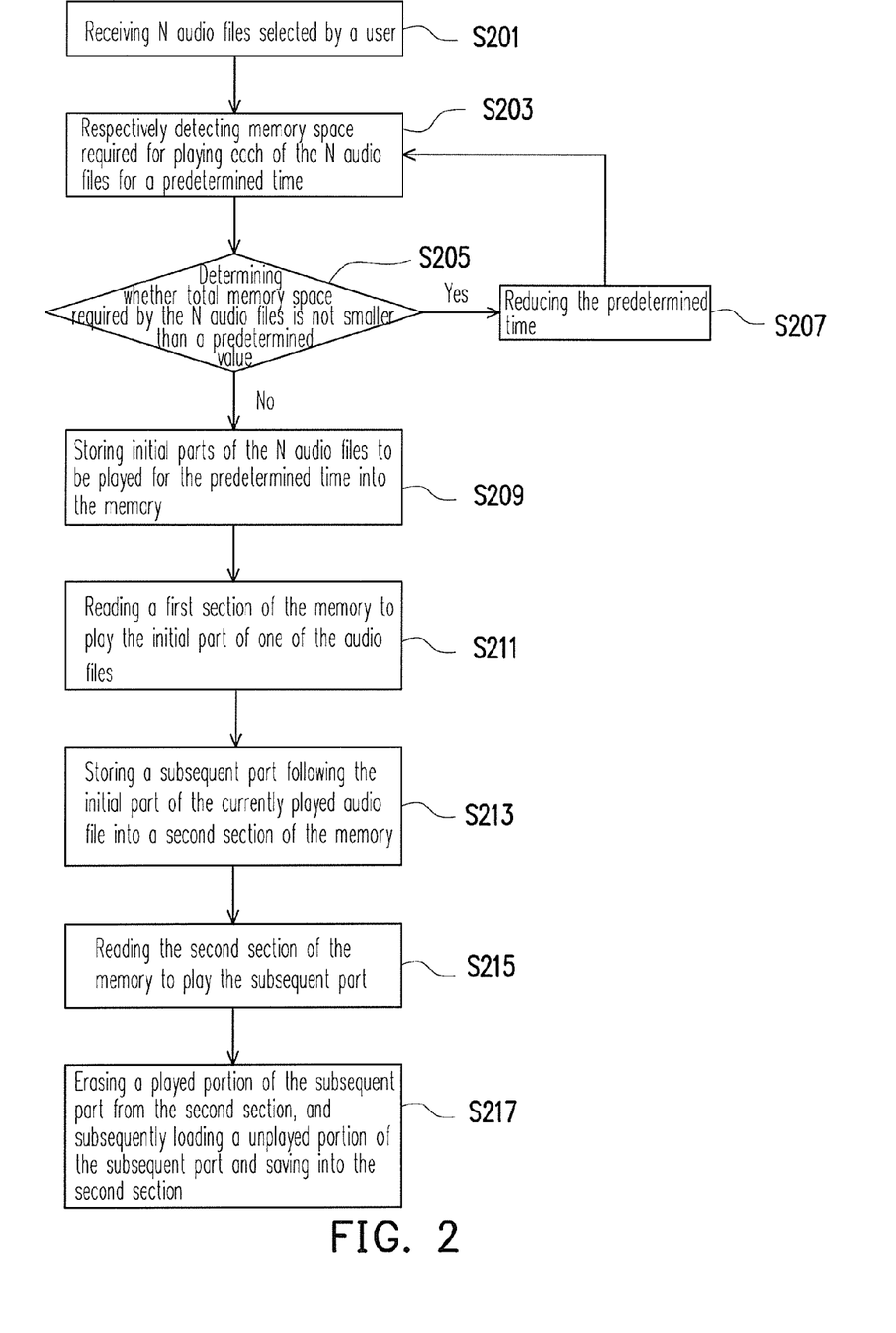
FIG. 2 is a flowchart of a multimedia playing method according to an embodiment of the present invention.

FIG. 2 is a flowchart of a multimedia playing method according to an embodiment of the present invention. In the present embodiment, audio files in MP3 format are played. Referring to both FIG. 1 and FIG. 2, first, in step S201, N audio files selected by a user are received, wherein $0<N\leq K$. For example, the user can select the N audio files from the K audio files provided by the storage unit (for example, a mini disc (MD)) 110 through the user interface 130. In the present embodiment, K=10, and N=3. Namely, the storage unit 110 stores 10 audio files TR1~TR10, and the user selects only 3 audio files TR1, TR3, TR5 from the 10 audio files TR1~TR10.

In step S203, the control unit 150 detects how much memory space dose each of the N audio files require for playing for a predetermined time T? Typically, the bitrate of an uncompressed audio file, such as the wav format with 16-bit resolution, 44100 Hz sampling frequency and 2 channel stereo sound, is about 1411K bit/s, i.e. 0.17 M byte/s, and the compression rate of the MP3 format is majorly between 5:1 and 11:1. Therefore, assuming the capacity M of the memory 140 is 1 M bytes and the compression rates of the audio files TR1, TR2, and TR3 are respectively 6:1, 7:1, and 10:1, TR1 requires 0.028 M byte/s, TR2 requires 0.024 M byte/s, and TR3 requires 0.017 M byte/s. Assuming the predetermined time T is 10 seconds, the control unit 150 detects the required memory space for playing the audio files TR1, TR3, and TR5 for 10 seconds is respectively S1=0.028*10=0.28, S2=0.024*10=0.24, and S3=0.017*10=0.17.

Then, the control unit 150 sums the memory space each file requires to obtain the total memory space required for playing the audio files TR1, TR3, and TR5 for 10 seconds as S1+S2+S3=0.69 M bytes. After that, in step S205, whether the total memory space required for playing the N audio files is not smaller than a predetermined value is determined. In other words, the control unit 150 determines whether the total memory space in the memory 140 required for playing the audio files TR1, TR3, and TR5 is not smaller than the predetermined value in the present example.

In the present embodiment, the predetermined value varies with the number of the N audio files. For example, if $N\leq 10$ (i.e., 10 audio files), the predetermined value is 60% of the capacity of the memory 140 (for example, if the capacity of the memory 140 is 1 M bytes, then the predetermined value is 0.6 M bytes), if $10<N\leq 15$ (i.e., 15 audio files), the predetermined value is 70% of the capacity of the memory 140 (for example, if the capacity of the memory 140 is 1 M bytes, then the predetermined value is 0.7 M bytes), and if N>15, the predetermined value is 80% of the capacity of the memory 140 (for example, if the capacity of the memory 140 is 1 M bytes, then the predetermined value is 0.8 M bytes). Foregoing arrangement is only an example of the present invention but not for limiting the scope of the present invention, and the user can adjust the predetermined value according to the actual requirement. In the present example, N=3, so the predetermined value is set to be 0.6 M bytes.

In step S205, the control unit 150 finds that the total memory space in the memory 120 required for playing the audio files TR1, TR3, and TR5 for 10 seconds is not smaller than the predetermined value (i.e. 0.69 M>0.6 M), the predetermined time is reduced in step S207 accordingly. Namely, the control unit 150 reduces the predetermined time T. For example, the predetermined time T is reduced to 80% of its original value (i.e., the predetermined time T is changed to 8 seconds). After that, the procedure returns to step S203, wherein the control unit 150 detects the memory space required for playing each of the audio files TR1, TR3, and TR5 for the predetermined time (i.e., 8 seconds) again to obtain S1=0.028*8=0.224 M bytes, S2=0.024*8=0.192 M bytes, and S3=0.017*8=0.136 M bytes.

In addition, the control unit 150 sums the memory space required for playing the audio files TR1, TR3, and TR5 for 8 seconds to get the total memory space required for playing these audio files for 8 seconds as S1+S2+S3=0.556 M bytes. Next, in step S205, the control unit 150 determines whether the total space in the memory 140 required for playing the audio files TR1, TR3, and TR5 for 8 seconds is not smaller than the predetermined value again. With 0.556 M<0.6 M, the control unit 150 finds that the total memory space required for playing the audio files TR1, TR3, and TR5 for 8 seconds is smaller than the predetermined value, and accordingly step S209 is executed, wherein the control unit 150 stores the initial parts of the TR1, TR3, and TR5 for playing for 8 seconds into the first section M1 of the memory 140.

If the control unit 150 finds in step S205 that the total space in the memory 140 required for playing the audio files TR1, TR3, and TR5 for 10 seconds is smaller than the predetermined value, step S209 is directly executed, wherein the control unit 150 directly stores the initial parts of the TR1, TR3, and TR5 for playing for 10 seconds into the memory 140.

In the present embodiment, the portion of the memory 140 for storing the initial parts of the N audio files to be played for the predetermined time is defined as the first section M1, and the other portion of the memory 140 is defined as a second section M2 of the memory 140. Thereafter, in step S211, when the multimedia playing apparatus 100 starts to play the audio file TR3, it read the first section M1 of the memory 140 to play the initial part of the audio file TR3. In step S213, the subsequent part following the initial part of the currently played audio file (i.e., the audio file TR3), meanwhile, is stored into the second section M2 of the memory 140. Namely, the subsequent part after the first 8 seconds of the audio file TR3 is stored into the second section M2 of the memory 140.

In step S215, after the initial part of the audio file TR3 stored in the first section M1 having been played out, the multimedia playing apparatus 100 reads the second section M2 of the memory 140 to play the subsequent part of the audio file TR3 so that the multimedia playing apparatus 100 can play the audio file TR3 continuously. In the present embodiment, since the capacity of the memory 140 is 1 M bytes and the capacity of the first section M1 of the memory 140 is 0.556 M bytes, and the capacity of the second section M2 of the memory 140 is 1−0.556−0.444 M bytes. Accordingly, the audio file TR3 has a shock protection time of about 0.444/0.017−26.1 seconds in the second section M2 of the memory 140.

In step S217, the played portion of the subsequent part is erased from the second section M2. Since the capacity of the second section M2 of the memory 140 is only 0.444 M which is much smaller than that of the whole TR3 size (i.e., the second section M2 can only store 26.1 seconds of the audio file TR3), in step S217, the control unit 150 erases the played portion of the subsequent part of the audio file TR3 from the second section M2 so that the part of the audio file TR3 which is not yet played can subsequently be stored into the second section M2 and accordingly the audio file TR3 can be played continuously. As described above, the audio file TR3 has an 8-second shock protection time in the first section M1 of the memory 140 while a 26.1-second shock protection time in the second section M2 of the memory 140. Thus, the total shock protection time of the audio file TR3 is calculated to be 8+26.1=34.1 seconds.

Since the total shock protection time is mainly determined by the capacity of the second section M2, step S205 is executed to prevent the capacity of first section M1 from being too large. For example, if the user happens to select some audio files but all of them are compressed in lower compression rates, the required capacity of the first section M1 may become larger. The larger the capacity of the first section M1 is, the smaller the capacity of the second section M2 and accordingly the shorter the total shock protection time is. Thus, if the memory space required by the audio files is not smaller than the predetermined value in step S205, the predetermined time is reduced in step S207 to reduce the capacity of the first section M1. Accordingly, the shock protection time (buffer time) can be effectively planned and the playing delay can be effectively reduced because the initial parts of the selected audio files are kept in the first section M1 of the memory 140 in the present embodiment.

Figure 3:
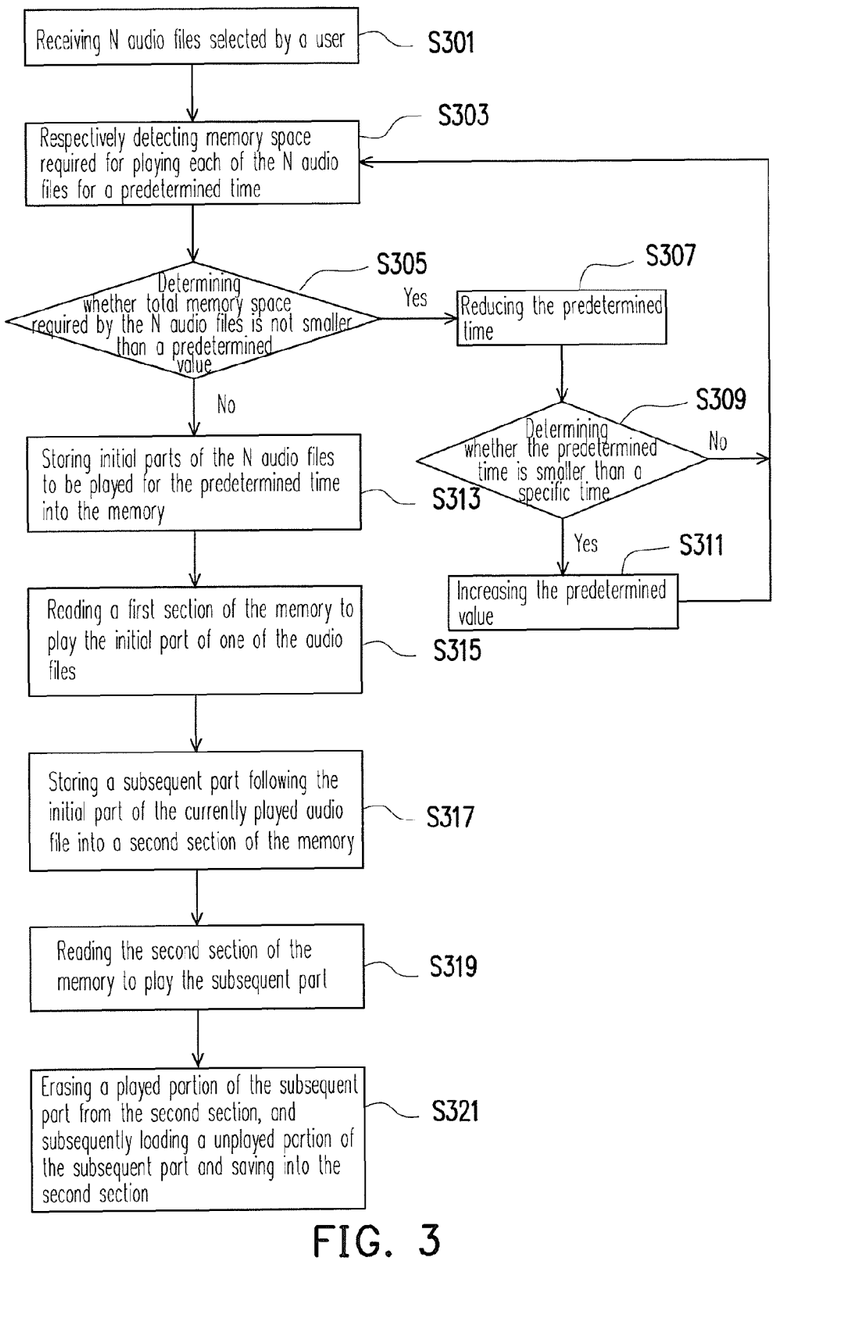
FIG. 3 is a flowchart of a multimedia playing method according to another embodiment of the present invention.

The multimedia playing method in the present invention will be further described with reference to another embodiment of the present invention. FIG. 3 is a flowchart of a multimedia playing method according to another embodiment of the present invention. The steps S301, S303, S305, S307, S313, S315, S317, S319, and S321 in the present embodiment are the same as the steps S201, S203, S205, S207, S209, S211, S213, S215, and S217 in FIG. 2, therefore, the description will be omitted herein.

Referring to both FIG. 1 and FIG. 3, in step S307, the control unit 150 reduces the predetermined time T. Then, in step S309, the control unit 150 determines whether the predetermined time is smaller than a specific time. Namely, the control unit 150 determines whether the predetermined time T (8 seconds) is smaller than the specific time. In the present embodiment, the specific time is the shock protection time (i.e., the least playable time) of the audio file which can be stored in the first section M1 of the memory 140, and which can be adjusted by the user according to the actual requirement.

If the control unit 150 finds that the predetermined time T is not smaller than the specific time, the process returns to step S303, wherein the control unit 150 respectively detects the memory space required by each of the audio files according to the adjusted predetermined time T. After that, the control unit 150 determines again whether the total space in the memory 140 required by the audio files is smaller than the predetermined value again.

If the control unit 150 finds that the total space in the memory 140 required by the audio files is smaller than the predetermined value, steps S313, S315, SS317, and S319 are executed. If the control unit 150 finds that the total space required by the audio files in the memory 140 is not smaller than the predetermined value, steps S307, S309, and S303 or steps S307, S309, and S311 are executed.

If the control unit 150 finds in step S309 that the predetermined time T is smaller than the specific time, the control unit 150 increases the predetermined value. Namely, the predetermined value of the first section M1 of the memory 140 is increased. For example, if the original predetermined value is 0.6 M bytes, the control unit 150 increases the predetermined value to 0.65 M bytes. However, the present invention is not limited to the adjustment described above, and the user can adopt an appropriate adjustment according to the actual requirement.

In the process of the present embodiment, the predetermined time T is first adjusted to prevent the capacity of the second section M2 from being too small because of the first section M1. However, if the predetermined time T is reduced to a certain specific time (for example, less than 1 second) and the predetermined time is still decreased, the shock protection function will become ineffective. Thus, the capacity of the second section M2 is sacrificed only when such a situation is encountered. Namely, the total shock protection time is reduced to obtain a better effect in the reduction of the playing delay. In the present embodiment, an optimal planning between the total shock protection time and the effect of reducing the playing delay is obtained by dynamically adjusting the capacities of the first section M1 and the second section M2. In particular, the present embodiment is more effective if it is applied to an apparatus with a memory 140 of smaller capacity.

Figure 4:
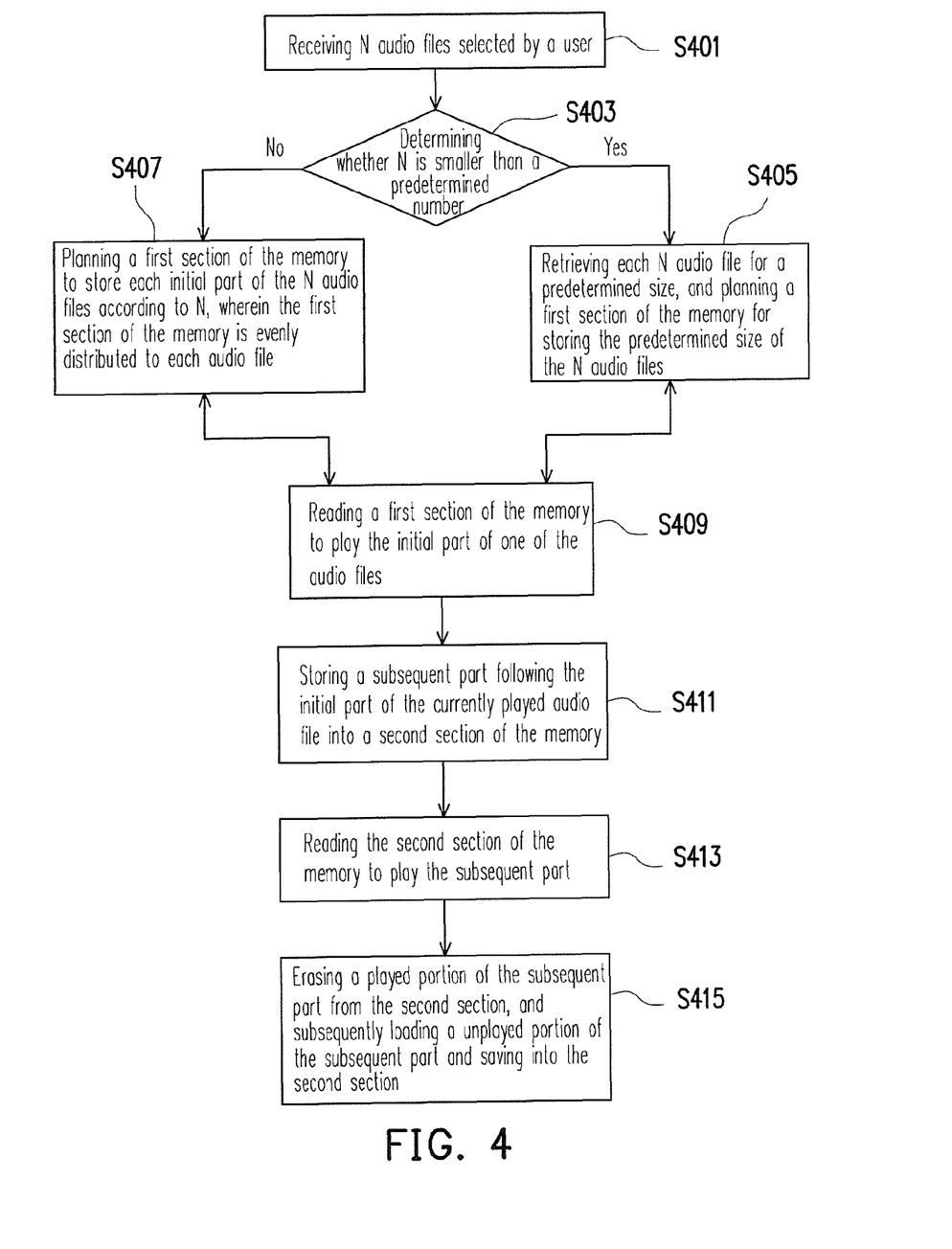
FIG. 4 is a flowchart of a multimedia playing method according to yet another embodiment of the present invention.

FIG. 4 is a flowchart of a multimedia playing method according to yet another embodiment of the present invention. In the present embodiment, audio files in WAV format are played, and it is assumed that the capacity M of the memory 140 is 8 M bytes. Referring to FIG. 1 and FIG. 4, first, in step S401, the multimedia playing apparatus 100 receives N audio files selected by a user, wherein $0<N\leq K$. For example, the user can select N audio files from the K audio files provided by the storage unit (for example, a CD) 110 through the user interface 130. In the present embodiment, K=10 and N=5. Namely, the storage unit 110 stores 10 audio files TR1~TR10, and the user only selects 5 audio files TR1, TR2, TR6, TR7, and TR8 from the 10 audio files TR1~TR10. Typically, the bitrate of an uncompressed audio file, such as the wav format with 16-bit resolution, 44100 Hz sampling frequency and 2 channel stereo sound, is about 1411K bit/s, i.e. 0.17 M byte/s.

Next, in step S403, whether N is smaller than a predetermined number is determined. In the present embodiment, the predetermined number J is 10. Thus, in step S403, the control unit 150 finds that N=5 is smaller than J=10 (i.e. N<J).

If N is smaller than the predetermined number, step S405 is executed to retrieve each initial part of the N audio file for a predetermined size and plan a first section M1 of the memory to store these retrieved initial parts. For example, the control unit 150 presets the predetermined size Q=0.5 M bytes. Because the user selects 5 audio files, the total memory space required is 0.5*5=2.5 M bytes. Accordingly, the control unit 150 plans the capacity of the first section M1 of the memory 140 as 2.5 M bytes. Because the capacity of the memory 140 is M=8 M bytes, the control unit 150 plans the capacity of a second section M2 in the memory 140 is 8−2.5=5.5 M bytes.

Thereafter, in step S409, the multimedia playing apparatus 100 reads the first section M1 to play the initial part of one of the N audio files. For example, the audio file TR2 is played. Because the predetermined size of the audio file TR2 is 0.5 M bytes, the audio file TR2 has a shock protection time of about 0.5/0.17=2.9 seconds in the first section M1 of the memory 140. Namely, the multimedia playing apparatus 100 plays the initial part (first 2.9 seconds) of the audio file TR2 first.

After that, in step S411, the subsequent part following the initial part of the currently played audio file is meanwhile stored into the second section M2 of the memory 140. Namely, the control unit 150 stores the subsequent part following the initial part (first 2.9 seconds) of the audio file TR2 into the second section M2 of the memory 140 so that the multimedia playing apparatus 100 can play the audio file TR2 continuously.

Since the capacity of the second section M2 of the memory 140 is 5.5 M bytes, the audio file TR2 has a shock protection time of about 5.5/0.17=32.4 seconds in the second section M2 of the memory 140. Next, in step S413, the control unit 150 reads the second section M2 of the memory 140 to make the multimedia playing apparatus 100 play the audio file TR2 continuously.

In step S415, the control unit 150 erases the played portion in the subsequent part of the audio file TR2 from the second section M2 and subsequently loads the unplayed portion of the subsequent part from the storage unit 110 and saves into the second section M2, so that the multimedia playing apparatus 100 can play the audio file TR2 continuously. As described above, the audio file TR2 has a shock protection time of 2.9 seconds in the first section M1 of the memory 140 and a shock protection time of 32.4 seconds in the second section M2 of the memory 140. Thus, the total shock protection time of the audio file TR2 is 2.9+32.4=35.3 seconds.

If the user selects 10 audio files (N=10) in step S401, then in step S403, the control unit 150 finds that N is not smaller than the predetermined number J (J=10 in this example), and then step S407 is executed, wherein the control unit 150 plans the capacity of the first section M1 of the memory 140 according to N, and then retrieves every N audio files for M1/N size as the initial part.

For example, assuming all the 10 audio files TR1~TR10 are selected (i.e., N=10), the control unit 150 plans the capacity of the first section M1 in the memory 140 as 60% of the capacity of the memory 140 (i.e., 8*0.6=4.8 M bytes); and assuming 15 audio files are selected (i.e., selected files up to N=15), the control unit 150 plans the capacity of the first section M1 of the memory 140 as 70% of the capacity of the memory 140 (i.e., 8*0.7=5.6 M bytes). The method for planning the capacity of the first section M1 of the memory 140 is only an example and not a limitation, and a user may arranges the capacity of the first section M1 of the memory 140 according to the actual requirement. In the present embodiment, N=10 and the capacity of the first section M1 of the memory 140 is set to be 60%. Since the capacity of the memory 140 is 8 M bytes and the capacity of the first section M1 of the memory 140 is 4.8 M bytes, the capacity of the second section M2 of the memory 140 is 3.2 M bytes.

In step S407, the control unit 150 retrieves each audio file TR1~TR10 for 0.48 M bytes as the initial part (i.e., the capacity of the first section M1 is evenly distributed to each audio file as 4.8/10=0.48 M bytes) and stores these initial parts into the first section M1 of the memory 140.

Thereafter, in step S409, the multimedia playing apparatus 100 reads the first section M1 to play one of the N audio files, such as the audio file TR2. Because the audio file TR2 stored in the first section M1 is 0.48 M bytes, the audio file TR2 has a shock protection time of about 0.48/0.17=2.8 seconds in the first section M1 of the memory 140. Namely, the multimedia playing apparatus 100 the first section M1 to play the initial part (first 2.8 seconds) of the audio file TR2 first.

In step S411, the subsequent part following the initial part of the currently played audio file is meanwhile stored into the second section M2 of the memory 140. Namely, the control unit 150 stores the subsequent part following the initial part (first 2.8 seconds) of the audio file TR2 into the second section M2 of the memory 140 so that the multimedia playing apparatus 100 can play the audio file TR2 continuously.

Because the capacity of the second section M2 of the memory 140 is 3.2 M bytes, the audio file TR2 has a shock protection time of about 3.2/0.17=18.8 seconds in the second section M2 of the memory 140. Next, in step S413, the control unit 150 reads the second section M2 of the memory 140 to make the multimedia playing apparatus 100 play the audio file TR2 continuously.

In step S415, the control unit 150 erases the played portion in the subsequent part of the audio file TR2 from the second section M2 and subsequently loads the unplayed portion of the subsequent part from the storage unit 110 and saves into the second section M2 of the memory 140 so that the multimedia playing apparatus 100 can play the audio file TR2 continuously. As described above, the audio file TR2 has a shock protection time of 2.8 seconds in the first section M1 of the memory 140 and a shock protection time of 18.8 seconds in the second section M2 of the memory 140. Thus, the total shock protection time of the audio file TR2 is 2.8+18.8=21.6 seconds.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A multimedia playing method, suitable for a multimedia playing apparatus, wherein the multimedia playing apparatus has a memory and K audio files, and K>0, the multimedia playing method comprising:
receiving N audio files selected by a user, wherein 0<N≦K;
respectively detecting memory space required for playing each of the N audio files for a predetermined time;
determining whether total memory space required by the N audio files is not smaller than a predetermined value;
if the total memory space required by the N audio files is not smaller than the predetermined value, reducing the predetermined time, and executing the detecting step again; and
if the total memory space required by the N audio files is smaller than the predetermined value, storing an initial part of each of the N audio files to be played for the predetermined time into the memory.

2. The multimedia playing method according to claim 1, wherein after the reducing step, the multimedia playing method further comprises:

determining whether the predetermined time is smaller than a specific time;
if the predetermined time is not smaller than the specific time, executing the detecting step again; and
if the predetermined time is smaller than the specific time, increasing the predetermined value.

3. The multimedia playing method according to claim 1 further comprising:
detecting a format and encoding information of the N audio files.

4. The multimedia playing method according to claim 3, wherein the format of the audio files is a MP3 format, an APE format, a FLAC format or a WAV format.

5. The multimedia playing method according to claim 1, wherein the predetermined value varies with N.

6. The multimedia playing method according to claim 1, wherein a portion of the memory for storing the initial parts of the N audio files to be played for the predetermined time is defined as a first section of the memory, and the other portion of the memory is defined as a second section of the memory.

7. The multimedia playing method according to claim 6 further comprising:
reading the first section of the memory to play the initial part of one of the N audio files;
storing a subsequent part following the initial part of the currently played audio file into the second section of the memory; and
reading the second section of the memory to play the subsequent part.

8. The multimedia playing method according to claim 7 further comprising: erasing a played portion of the subsequent part from the second section; and
subsequently loading a unplayed portion of the subsequent part and saving into the second section.

9. A multimedia playing method, suitable for a multimedia playing apparatus, wherein the multimedia playing apparatus has a memory and K audio files, and K>0, the multimedia playing method comprising:
receiving N audio files selected by a user, wherein $0<N\leq K$;
determining whether N is smaller than a predetermined number;
if N is smaller than the predetermined number, retrieving each N audio file for a predetermined size, and planning a first section of the memory for storing the predetermined size of the N audio files; and
if N is not smaller than the predetermined number, planning a first section of the memory to store each initial part of the N audio files according to N, wherein the first section of the memory is evenly distributed to each audio file.

10. The multimedia playing method according to claim 9, wherein a portion of the memory for storing the initial parts of the N audio files is defined as a first section of the memory, and the other portion of the memory is defined as a second section of the memory.

11. The multimedia playing method according to claim 10 further comprising:
reading the first section of the memory to play the initial part of one of the N audio files;
storing a subsequent part following the initial part of the currently played audio file into the second section of the memory; and
reading the second section of the memory to play the subsequent part.

12. The multimedia playing method according to claim 11 further comprising:
erasing a played portion of the subsequent part from the second section; and
subsequently loading a unplayed portion of the subsequent part and saving into the second section.

13. The multimedia playing method according to claim 9 further comprising: detecting a format and encoding information of the N audio files.

14. The multimedia playing method according to claim 13, wherein the format of the audio files is a MP3 format, an APE format, a FLAC format or a WAV format.

* * * * *